United States Patent
Lindahl

(10) Patent No.: US 8,682,460 B2
(45) Date of Patent: Mar. 25, 2014

(54) SYSTEM AND METHOD FOR PERFORMING AUDIO PROCESSING OPERATIONS BY STORING INFORMATION WITHIN MULTIPLE MEMORIES

(75) Inventor: Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1084 days.

(21) Appl. No.: 12/701,559

(22) Filed: Feb. 6, 2010

(65) Prior Publication Data

US 2011/0196517 A1    Aug. 11, 2011

(51) Int. Cl.
*G06F 17/00* (2006.01)

(52) U.S. Cl.
USPC .............. 700/94; 365/227; 713/320; 713/324

(58) Field of Classification Search
USPC ....................... 365/227; 713/320–340; 700/94
See application file for complete search history.

(56) References Cited

U.S. PATENT DOCUMENTS

| | | | |
|---|---|---|---|
| 6,606,388 B1 | 8/2003 | Townsend et al. | |
| 6,965,804 B1 | 11/2005 | Mercs et al. | |
| 7,233,832 B2 | 6/2007 | Friedman et al. | |
| 7,425,674 B2 | 9/2008 | Moulios et al. | |
| 7,487,346 B2 | 2/2009 | Crandall et al. | |
| 7,536,565 B2 | 5/2009 | Girish et al. | |
| 7,559,026 B2 | 7/2009 | Girish et al. | |
| 2004/0257432 A1 | 12/2004 | Girish et al. | |
| 2005/0165501 A1* | 7/2005 | Lian et al. ....................... | 700/94 |
| 2005/0201572 A1 | 9/2005 | Lindahl et al. | |
| 2005/0216674 A1* | 9/2005 | Robbin et al. ................ | 711/138 |
| 2006/0067535 A1 | 3/2006 | Culbert et al. | |
| 2006/0067536 A1 | 3/2006 | Culbert et al. | |
| 2006/0153040 A1 | 7/2006 | Girish et al. | |
| 2006/0221788 A1 | 10/2006 | Lindahl et al. | |
| 2006/0274905 A1 | 12/2006 | Lindahl et al. | |
| 2007/0083467 A1 | 4/2007 | Lindahl et al. | |
| 2007/0157268 A1 | 7/2007 | Girish et al. | |
| 2007/0294496 A1* | 12/2007 | Goss et al. ..................... | 711/163 |
| 2008/0075296 A1 | 3/2008 | Lindahl et al. | |
| 2009/0003115 A1* | 1/2009 | Lindahl et al. ................ | 365/227 |
| 2009/0005891 A1 | 1/2009 | Batson et al. | |
| 2009/0006488 A1 | 1/2009 | Lindahl et al. | |
| 2009/0006671 A1 | 1/2009 | Batson et al. | |
| 2009/0024234 A1* | 1/2009 | Archibald ....................... | 700/94 |

(Continued)

FOREIGN PATENT DOCUMENTS

EP      0969470 B1    9/2008

OTHER PUBLICATIONS

Archibald, Fitzgerald J.; Texas Instruments; Cross Fade of Digital Audio Streams; White Paper SPRAAJ5-Jul. 2008; pp. 1-12.

*Primary Examiner* — Fan Tsang
*Assistant Examiner* — David Siegel
(74) *Attorney, Agent, or Firm* — Blakely, Sokoloff, Taylor & Zafman LLP

(57) ABSTRACT

Systems, methods, and devices are provided for performing audio processing operations, such as crossfading between two audio streams, by storing information on multiple memories. In one example, such a method may include storing a first portion of information associated with an audio processing operation on a first memory. A second memory may be activated, upon which a second portion of the information associated with the audio processing operation may be stored. The audio processing operation may be performed using a processor with the information stored on the first memory and the second memory. When the audio processing operation has completed, the second memory may be deactivated.

24 Claims, 5 Drawing Sheets

(56) References Cited

U.S. PATENT DOCUMENTS

| | | |
|---|---|---|
| 2009/0060472 A1 | 3/2009 | Bull et al. |
| 2009/0083047 A1 | 3/2009 | Lindahl et al. |
| 2009/0167508 A1 | 7/2009 | Fadell et al. |
| 2009/0167509 A1 | 7/2009 | Fadell et al. |
| 2009/0172542 A1 | 7/2009 | Girish et al. |
| 2009/0182445 A1 | 7/2009 | Girish et al. |
| 2009/0300397 A1* | 12/2009 | Nguyen et al. ............... 713/324 |
| 2010/0161923 A1* | 6/2010 | Gadelrab .................... 711/162 |

* cited by examiner

SYSTEM AND METHOD FOR PERFORMING AUDIO PROCESSING OPERATIONS BY STORING INFORMATION WITHIN MULTIPLE MEMORIES

BACKGROUND

The present disclosure relates generally to audio processing in electronic devices and, more particularly, to efficient audio processing in portable electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Portable electronic devices are increasingly capable of performing a range of audio operations in addition to simply playing back streams of audio. One such audio operation, crossfading between songs, may take place as one audio stream ends and another begins to seamlessly transition between the two audio streams. Typically, an electronic device may crossfade two audio streams by mixing the two streams over a span of time (e.g., 1-10 seconds), during which the volume level of the first audio stream is slowly decreased and the volume level of the second audio stream is slowly increased. To perform a crossfading operation, the electronic device may track and/or store the decoding state of each audio stream and alternatingly decode and mix each stream based on these stored states.

Certain ultra-portable electronic devices may employ significantly fewer resources than most portable electronic devices. These ultra-portable devices may conserve power and/or space by eliminating hardware present in other portable electronic devices. With reduced hardware resources, however, these devices may lack certain memory-utilizing functionalities. For example, many ultra-portable resource-constrained electronic devices may lack the ability to crossfade between songs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for performing audio processing operations, such as crossfading between two audio streams, by storing information on multiple memories. In one example, such a method may include storing a first portion of information associated with an audio processing operation on a first memory. A second memory, previously deactivated, may be activated, upon which a second portion of the information associated with the audio processing operation may be stored. The audio processing operation may be performed using a processor with the information stored on the first memory and the second memory. When the audio processing operation has completed, the second memory may be deactivated.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
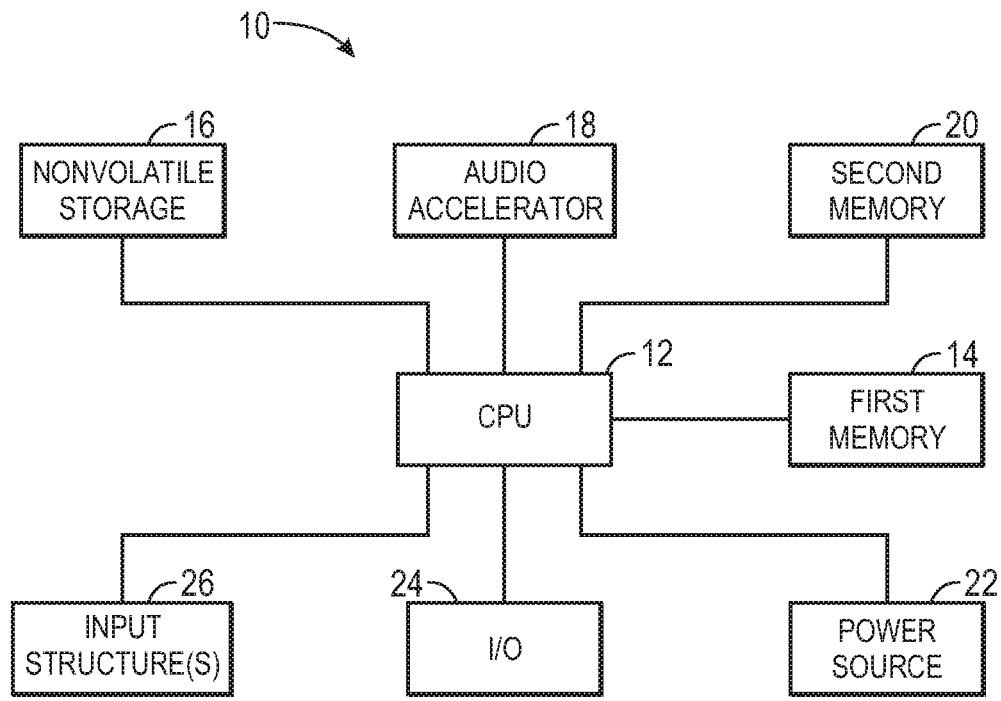
FIG. 1 is a block diagram of an electronic device configured to carry out techniques of the present disclosure, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to techniques for efficient audio processing by storing data associated with such processing on multiple memories, at least one of which may be active on an as-needed basis for performing certain audio operations. Based on the present techniques, an ultra-portable electronic device with power consumption constraints may perform many functions traditionally reserved for electronic devices with greater resources and/or power consumption. The present techniques may similarly benefit other electronic devices by enabling such devices to perform such functions with reduced total power consumption.

By way of example, an ultra-portable electronic device may conduct audio processing operations according to the present techniques using a minimal amount of first memory (e.g., static ram (SRAM)) of the electronic device. This first memory may include rapid, but expensive, memory capable of providing all of the memory resources needed for audio operations while playing a single audio stream. In addition, the electronic device may also include a less expensive, but power-hungry, second memory (e.g., some generation of double data rate (DDR) synchronous dynamic random access memory (SDRAM)), which may remain unused and powered off during this time. When other operations that consume more memory are desired, the second memory may be powered on and used to store data that does not fit onto the first memory. When such operations have completed, the second memory may be powered off.

In one example, an electronic device may perform a crossfading operation by powering on the second memory only just before the crossfading operation begins. Audio data from two audio streams may be decoded respectively in certain time increments (e.g., one frame at a time, or approximately 23 ms). In one embodiment, the audio streams may be decoded by a hardware audio accelerator of the electronic device. Once an increment of one of the audio streams is decoded, the decoding process may be halted, and the current decoding state of the audio stream may be saved into memory. As it may be desirable to conserve memory resources in the first memory to facilitate other operations of the electronic device, at least one of the decoding states may be stored on the second memory. The decoding states may be alternatingly loaded onto the audio accelerator and the audio streams alternatingly decoded by the audio accelerator, and the process may repeat until the crossfading operation has completed. After the crossfading operation is completed, only one of the audio states may be employed by the electronic device, since only one audio stream will remain playing. Thus, after the crossfading operation has completed, the second memory may be powered off to conserve power.

In some embodiments, the second memory may be automatically powered on in anticipation of the crossfading operation or other audio processing operation. The powering-on or otherwise activating of the second memory may take place when an audio processing operation that involves more information storage than would be available on the first memory, considering other information already stored on the first memory, is expected to take place. Such an operation may be expected to take place, for example, at a certain time before an audio stream is expected to end, at which point a cross-fading operation may begin. In other embodiments, such an operation may be expected to take place when a user of the electronic device takes an action indicative that indicates a new audio stream is about to begin.

Additionally, in certain embodiments, the second memory may be powered on while the electronic device performs certain other audio processing operations. By way of example, the second memory may be temporarily powered on to store data associated with an equalization operation, a podcast buffering operation, an operation mixing various sound effects, and so forth. In some embodiments, the second memory may temporarily store certain audio coder-decoders (codecs) for decoding certain encoded audio streams. For example, certain advanced audio codecs, such as high-efficiency advanced audio coding (HE-AAC), may use more much memory space than available on the first memory. Thus, the electronic device may play back an audio stream encoded with such audio codecs by temporarily powering on the second memory and storing the codec thereon for the duration of the audio stream. When such operations have ended, the second memory may be powered off to reduce power consumption.

With the foregoing in mind, FIG. 1 represents a block diagram of such an electronic device 10 capable of performing the techniques disclosed herein. Among other things, the electronic device 10 may include a central processing unit (CPU) 12, a first memory 14, nonvolatile storage 16, an audio accelerator 18, a second memory 20, a power source 22, input/output (I/O) 24 capabilities, and/or input structure(s) 26. In alternative embodiments, the electronic device 10 may include more or fewer components. For example, in certain embodiments, the electronic device 10 may include a display. In other embodiments, the electronic device 10 may lack the audio accelerator 18 and may instead perform all audio processing using the CPU 12.

In general, the CPU 12 may govern the operation of the electronic device 10. The electronic device 10 may represent an embedded system, in which the CPU 12 may rely primarily on the first memory 14 for temporary storage. The first memory 14 may include static random access memory (SRAM) or some other type of memory. In certain embodiments, the first memory 14 may be faster, more power efficient, and/or more expensive than the second memory 20. Based on instructions, which may be loaded into the first memory 14 from the nonvolatile storage 16, the CPU 12 may control the components of the electronic device 10 to perform a variety of techniques for efficiently processing audio streams, as disclosed herein.

In addition to these instructions, the nonvolatile storage 16 also may store audio data (e.g., songs, podcasts, voice notes, and so forth) encoded according to any number of suitable audio codecs (e.g., AAC, MP3, Ogg Vorbis, and so forth). Thus, the nonvolatile storage 16 may further include audio code for decoding the audio data using the CPU 12 and/or audio accelerator 18. By way of example, the nonvolatile storage 16 may include a hard disk drive and/or solid state storage, such as Flash memory.

In the embodiment of FIG. 1, rather than decode the audio data from the nonvolatile storage 16 using the CPU 12, which may be relatively inefficient and may unnecessarily consume power, the audio accelerator 18 may perform such decoding tasks. In particular, the audio accelerator 18 may decode the audio based on an associated coder-decoder (codec) stored in memory, such as the first memory 14. When only one stream is being decoded, the audio accelerator 18 may rely exclusively on data exchanged with the first memory 14. At certain times, such as when two audio streams are to be decoded for a crossfading operation, the audio accelerator 18 may be halted while decoding a first of the audio streams and its current audio decoding state may be saved. A second decoding state may be loaded onto the audio accelerator and an increment of the second audio stream may be decoded. Once the increment of the second audio stream has been decoded, the previously-saved audio decoding state may be reloaded into the audio accelerator 18, and the audio accelerator 18 may continue decoding the first audio stream where it left off. Such a capability may be employed during a variety of audio processing operations, including a crossfading operation, as described in greater detail below.

The second memory 20 may generally remain powered off during the operation of the electronic device 10, as noted above. However, during certain operations, such as the crossfading operation mentioned above, the second memory 20 may be powered on temporarily. While active, the second memory 20 may store certain data, such one or more audio decoding states of the audio accelerator 18. After the audio processing operation has completed, the second memory 20 may be powered off, reducing the amount of power consumed when only a single audio stream is being played back.

In some embodiments, the second memory 20 may be slower, less power efficient, and/or less expensive than the first memory 14. Moreover, in certain embodiments, the CPU 12, the first memory 14, the non-volatile storage 16, and/or the audio accelerator 18 may all be located on a single chip (e.g., a system on a chip (SOC)). The second memory 20 may or may not be located on such a chip. Thus, in certain embodiments, the second memory 20 may be external to a chip that includes the CPU 12, and may be referred to as "external memory." For such embodiments, the first memory 14 may be referred to as "internal memory" because the first memory 14 is located on the main chip that includes the CPU 12 and/or because the first memory 14 is located within the CPU 12 itself.

The power source 22 may include a rechargeable battery, such as a lithium polymer (Li-poly) battery. By employing the presently-disclosed techniques, the electronic device 10 may carry out certain relatively-memory-intensive audio operations without consuming significantly higher resources. Thus, the power source 22 may take up less space while achieving the same battery life as a similar electronic device that does not employ such techniques. The I/O 24 may enable the electronic device 10 to transfer and receive various data, including audio data, from another electronic device. In certain embodiments, various user instructions may arrive via the I/O 24 and/or various input structures 26 of the electronic device 10.

Figure 2:
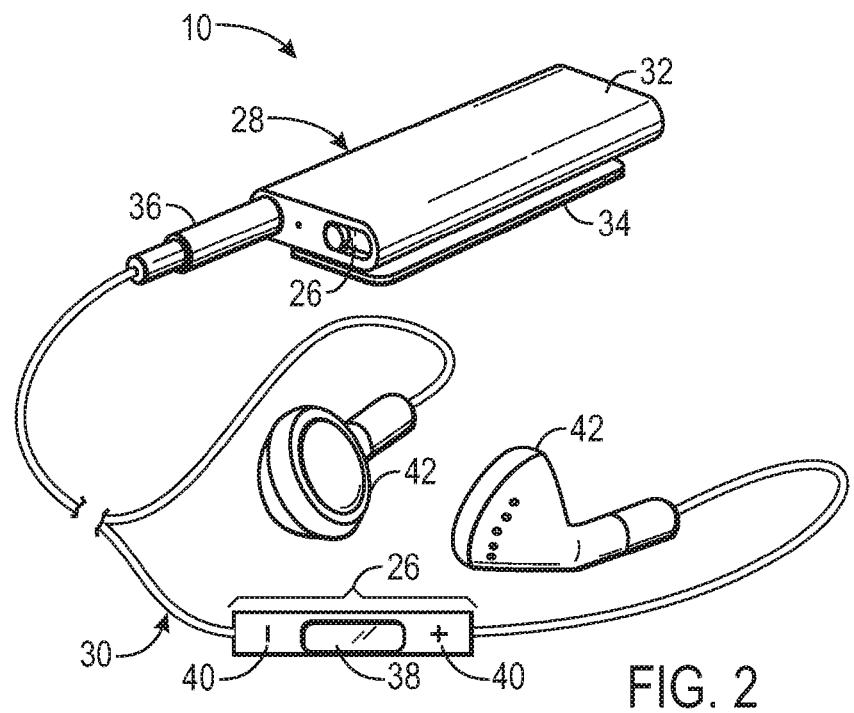
FIG. 2 is a perspective view of the electronic device of FIG. 1 in the form of an ultra-portable audio player, in accordance with an embodiment.

The electronic device 10 may be an ultra-portable electronic audio device, as illustrated in FIG. 2. In the embodiment of FIG. 2, the electronic device 10 is an iPod Shuffle® by Apple Inc., and may include an audio player 28 component and an interactive headset 30 component. The audio player 28 may include an enclosure 32 to protect internal electronic components from dirt, some moisture, and certain electromagnetic interference (EMI), and an external clip 34 to attach to clothes for enhanced portability. A headphone jack 36 may serve as an I/O port 24 to interface with other electronic devices, such as a computer, as well as the interactive headset 30. In some embodiments, the audio player 28 may include a separate I/O port 24 distinct from the headphone jack 36.

Both the audio player 28 and the interactive headset 30 may include certain input structures 26. By way of example, an input structure 26 on the audio player 28 may include a sliding switch for varying the operation of the audio player 28. When the sliding switch is moved to the left, audio tracks stored on the audio player 28 may be played in order, when the switch is moved to a center position, the audio player 28 may shuffle from one audio track to another in a random fashion, and when the switch is moved to the right, the audio player 28 may be deactivated. The input structures 26 located on the interactive headset 30 may include a play/pause button 38 and/or volume buttons 40. Ear buds 42 may output audio from the audio player 28 to the user.

Figure 3:
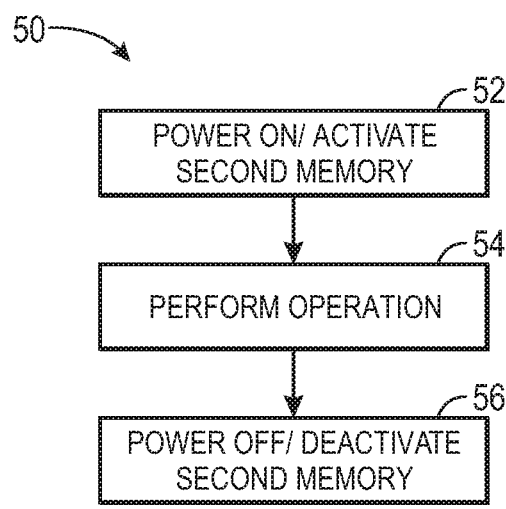
FIG. 3 is a flowchart describing an embodiment of a method for performing an audio processing operation.

When the electronic device 10 is playing back only one audio stream, the electronic device 10 may in some instances rely solely on the first memory 14 or on a portion of the second memory 20. During this time, the second memory 20 or an unused portion thereof may remain powered off and/or in a low power state. As shown in FIG. 3, which illustrates a flowchart 50, before the electronic device 10 performs an operation that requires more memory than currently available in the first memory 14 (a "relatively memory-intensive" operation), the electronic device 10 may power on or activate the second memory 20 from a low power state at block 52. Block 52 may begin in response to a stimulus. For example, as discussed further below, the second memory 20 may be powered on and/or activated automatically when the time remaining for an audio stream begins to end, or in response to user action, such as when a user navigates a user interface of the electronic device 10 and/or otherwise indicates that a relatively memory-intensive operation is desired. The second memory 20 may be powered on, for example, when the CPU 12 transmits a control signal to a switch, which may cause power to flow to the second memory 20 and/or associated memory bus(es) and/or memory controller. Additionally or alternatively, the CPU 12 may send a control signal to a memory controller associated with the second memory 20, which may similarly cause the second memory 20 and/or associated memory bus(es) to be powered on.

With additional memory storage available in the second memory 20, the electronic device 10 may then perform a relatively memory-intensive operation, at block 54. Such an operation may include, for example, a crossfading operation, an equalization operation, a podcast buffering operation, an operation mixing various sound effects, and/or decoding audio encoded with certain advanced audio codecs, such as high-efficiency advanced audio coding (HE-AAC), since the audio code and/or processing data associated therewith may use more memory space than available on the first memory 14. Once the operation of block 54 has completed, at block 56, the second memory 20 may be powered down or deactivated into a low-power state.

Figure 4:
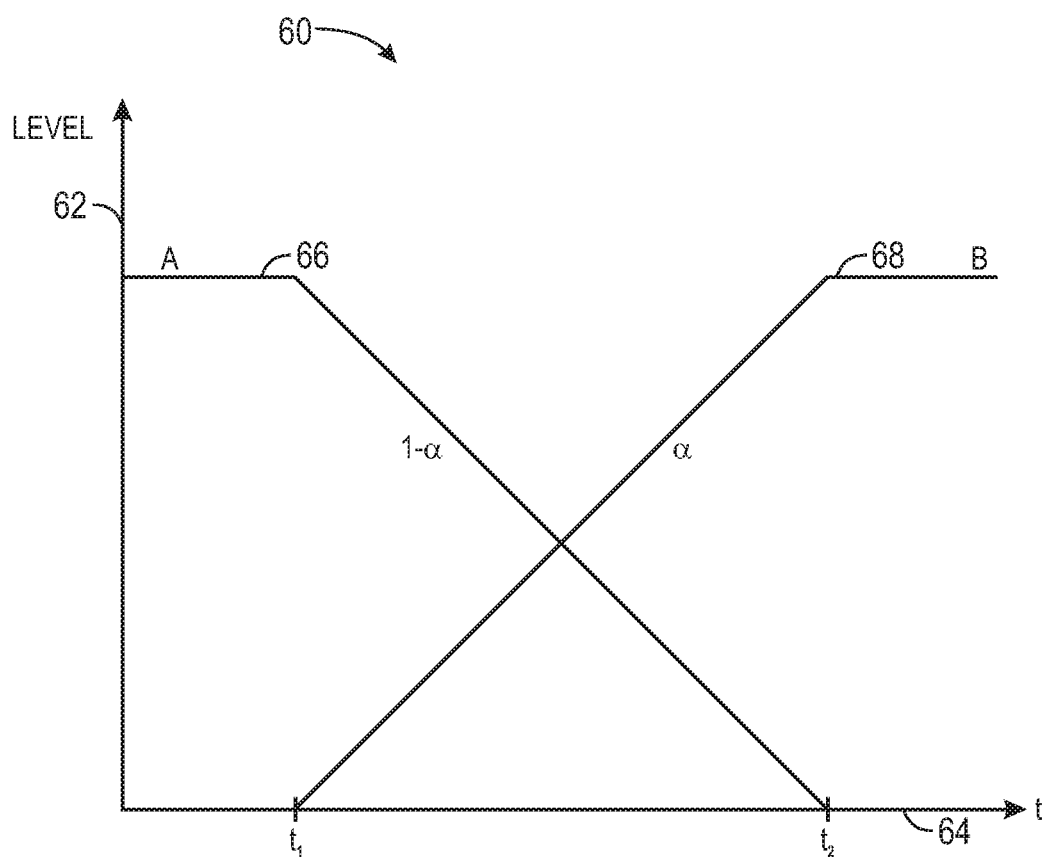
FIG. 4 is a plot illustrating a crossfading operation between two audio streams, in accordance with an embodiment.

As mentioned above, one relatively memory-intensive operation that the electronic device 10 may perform while the second memory 20 is powered on may include crossfading two audio streams. Such an operation may require additional memory because, while the two audio streams are concurrently decoded and mixed, information exceeding the storage capabilities of the first memory 14 may be generated. A plot 60 of FIG. 4 represents one manner in which crossfading may occur between two audio streams A and B. In the plot 60, an ordinate 62 represents relative volume and/or power level (Level) and an abscissa 64 represents relative time (t). Curves 66 and 68 respectively represent audio streams A and B.

At the start of the plot 60, audio stream A (curve 66) may be the sole audio stream being decoded and output by the electronic device 10. Before audio stream A (curve 66) ends at time t2, the electronic device 10 may begin to decode and mix audio stream B (curve 68) at time t1. The crossfading of audio streams A (curve 66) and B (curve 68) may take place between times t1 and t2, during which audio stream B (curve 68) may be gradually increased at a relative level coefficient $\alpha$ and audio stream A (curve 66) may be gradually decreased at a relative level coefficient $1-\alpha$. It should be understood that the precise coefficients $\alpha$ and/or $1-\alpha$ employed during the crossfading operation may vary and, accordingly, need not be linear or symmetrical. Beyond time t2, the electronic device 10 may remain decoding and outputting only audio stream B until crossfading to the next audio stream in the same or similar manner.

Figure 5:
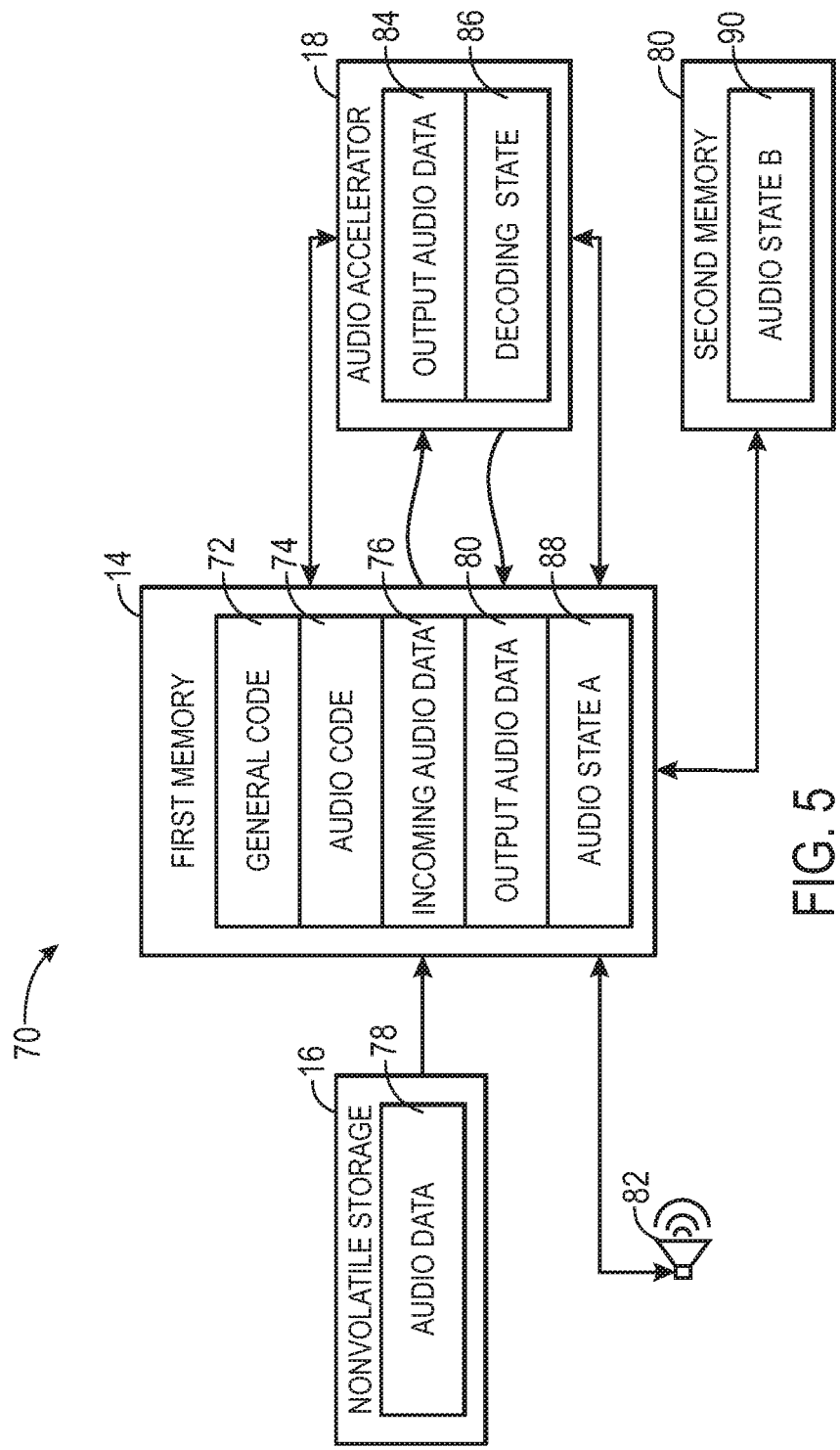
FIG. 5 is a block diagram illustrating a manner of performing a crossfading operation, in accordance with an embodiment.

Between times t1 and t2, the crossfading operation may involve alternatingly decoding and mixing increments of both audio streams A and B. A system 70, illustrated in FIG. 5, may be employed by the electronic device 10 for decoding and mixing audio streams A and B in increments (e.g., by one or more frames of audio), to perform a crossfading operation. FIG. 5 illustrates various interactions between the first memory 14, nonvolatile storage 16, audio accelerator 18, and second memory 20 that may take place to crossfade between two audio streams.

In particular, the limited storage space of the first memory 14 may first include general code 72, which may govern the basic operation of the electronic device 10, and thus also may include instructions for carrying out the techniques disclosed herein. Audio code 74 may include one or more codecs, which may be employed by the audio accelerator 18 to decode certain audio data, such as incoming audio data 76, that may be sent to the audio accelerator 18. By way of example, the incoming audio data 76 may represent audio streams A and/or B, which may be, for example, songs, podcasts, and/or voice notes encoded in AAC, MP3, or any other suitable format. The incoming audio data 76 may be a buffered stream from among audio data 78, which may be stored on the nonvolatile storage 16 and transferred to the first memory 14.

The audio accelerator 18 may decode increments of the encoded incoming audio data 76 and may output decoded output audio data 80, representing decoded audio streams A or B, which may be stored in a circular buffer in the first memory 14. As may be appreciated, a circular buffer may be a memory buffer that follows a first-in-first-out (FIFO)

scheme to facilitate streaming data. The decoded output audio data 80 may be read out of the circular buffer through a DMA request and output to a digital-to-analog (D/A) converter and/or other processing logic, and/or a mix of the streams A and B may be output to an audio output device 82, such as the interactive headset 30, via the headphone jack 36. In other embodiments, a mix of the streams A and B may be output digitally via some other I/O port(s) 24.

To decode the incoming audio data 76 into decoded output audio data 80, the audio accelerator 18 may load a codec, represented in FIG. 5 as working audio code 84. In particular, the codec may be of a format in which the currently-input incoming audio data 76 is encoded. Additionally, the audio accelerator 18 may load from the first memory 14 a current decoding state 86, representing the last decoding state of the audio accelerator 18 associated with the currently-input incoming audio data 76 in an audio stream that was previously decoded. By way of example, to decode audio stream A, the working audio code 84 that decodes audio stream A may be loaded from the audio code 74, and the current decoding state 86 of the audio accelerator 18 may be loaded from audio state A 88 stored on the first memory 14.

The audio accelerator 18 may decode, for example, one or more frames of audio stream A from the incoming audio data 76 and output these frames into output audio data 80, before switching to decode an increment of audio stream B. Before taking action to decode audio stream B, the audio accelerator 18 may be halted and its current state for audio stream A may be saved. This state of the audio accelerator 18 may be stored as the audio state A 88.

To decode audio stream B, the audio accelerator 18 may load the working audio code 84 that decodes audio stream B from the audio code 74, as well as load the decoding state 86 as audio state B 90. However, as illustrated in FIG. 5, the first memory 14 may not hold enough data to store both the audio state A 88 and the audio state B 90 (along with other data in the first memory 14) at the same time. Thus, for the duration of the crossfading operation, the second memory 20 may be powered on, during which time it may alternatingly hold audio state A 88 or audio state B 90. Before loading audio state B 90 as the decoding state 86 of the audio accelerator 18, audio state A 88 may first be copied onto the second memory 20, after which audio state B 90 may be copied onto the first memory 14 in place of audio state A 88.

In certain embodiments, the audio code 74 associated with decoding one or both audio streams may generally be too large to store entirely on the first memory 14. Under such conditions, portions of the audio code 74, such as a codec for decoding an audio stream currently not being decoded, also may be stored on the second memory 20. By way of example, while the audio accelerator 18 is decoding audio stream A, both the audio state B 90 and the portion of the audio code 74 that decodes audio stream B may be stored on the second memory 20. Thereafter, the audio state B 90 may be swapped with audio state A 88 in the first memory 14 and the portion of the audio code 74 that decodes the audio stream B may be swapped with the portion of the audio code 74 that decodes audio stream A in the first memory 14.

Figure 6:
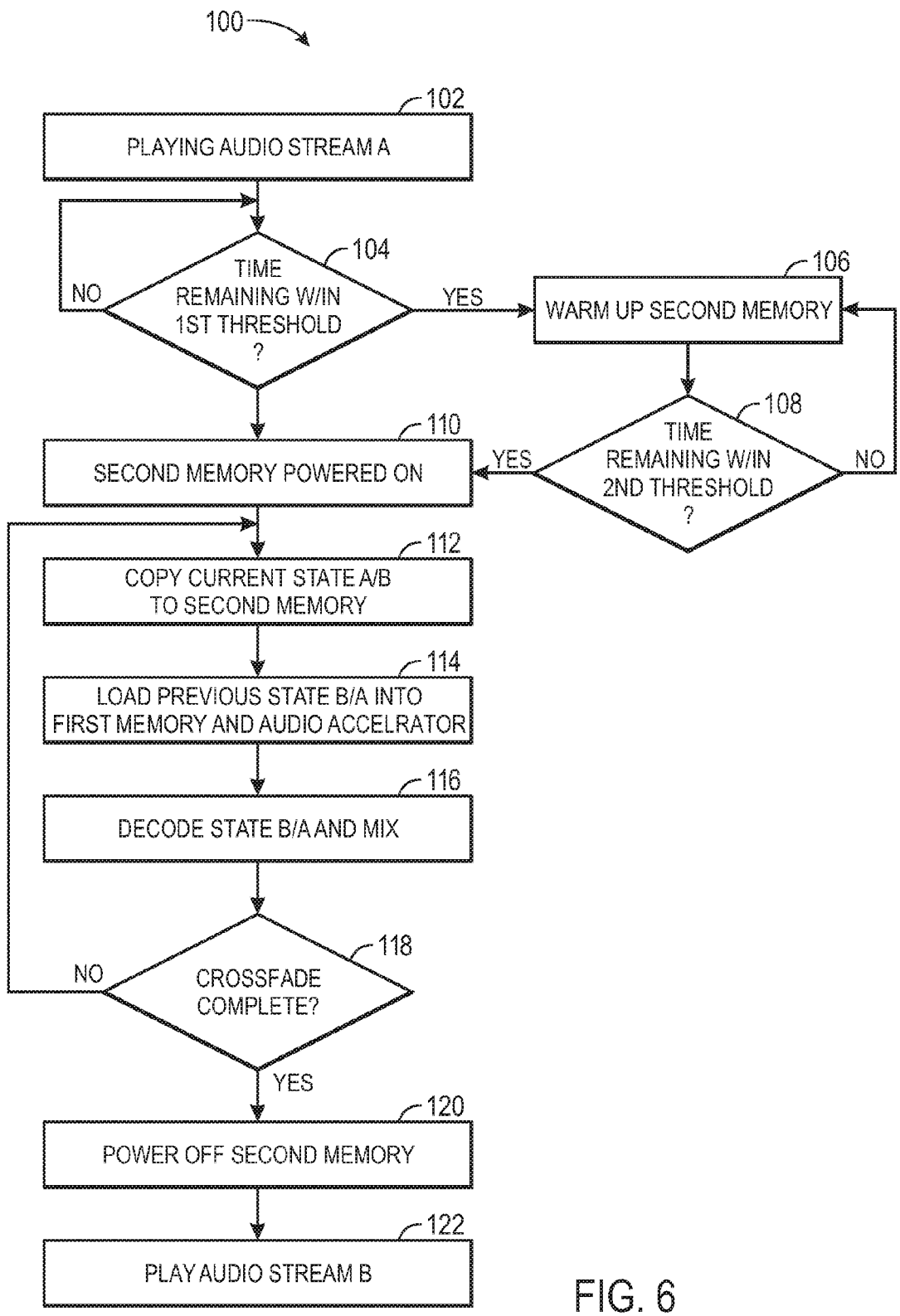
FIG. 6 is a flowchart describing an embodiment of a method for performing a crossfading operation with multiple memory resources.
Figure 7:
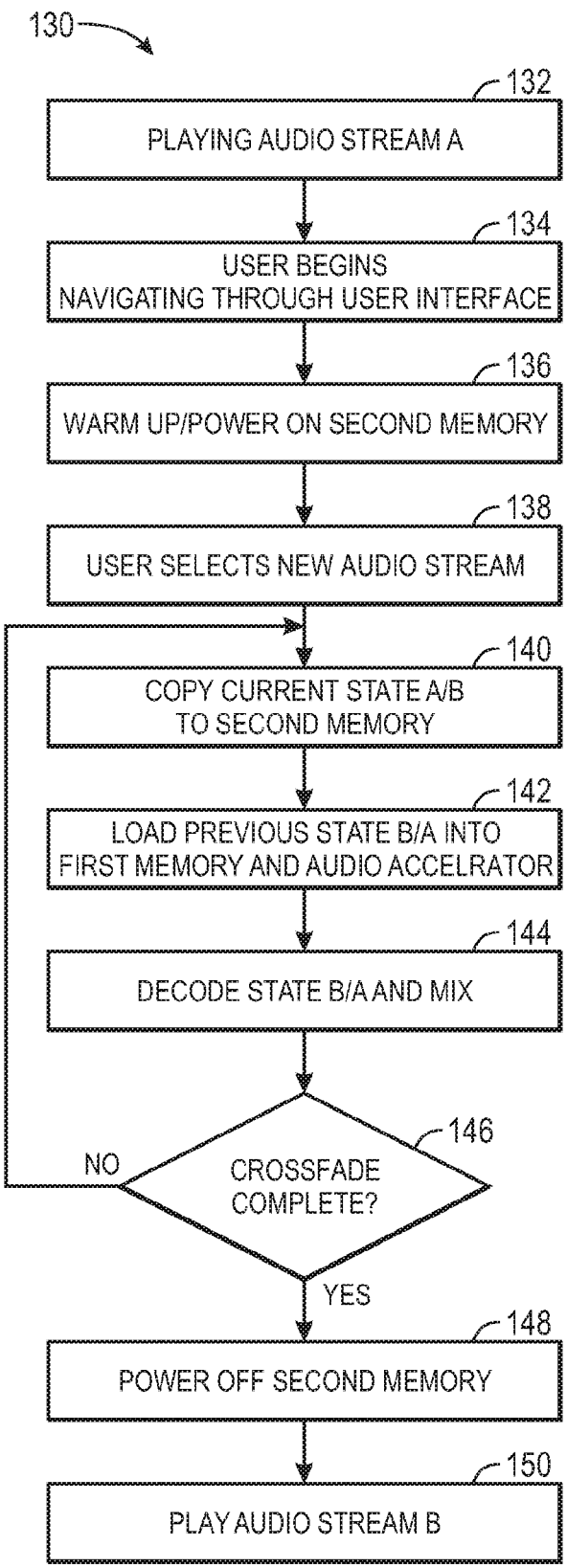
FIG. 7 is another flowchart describing an embodiment of a method for performing a crossfading operation with multiple memory resources, in accordance with an embodiment.

The electronic device 10 may carry out a crossfading operation in a variety of manners. For example, FIGS. 6 and 7 represent two flowcharts describing embodiments of methods for carrying out crossfading operations between two audio streams, audio stream A and audio stream B, using the system 70 of FIG. 5. Turning first to FIG. 6, a flowchart 100 may begin when, at block 102, the electronic device 10 is only playing back audio stream A. Thus, the audio accelerator 18 may be playing back only audio stream A from among the incoming audio data 76, the audio code 84 of the audio accelerator 18 may include a codec for decoding audio stream A, and the decoding state 86 of the audio accelerator 18 may be the audio state A 88. Since only audio stream A is being decoded, the second memory 20 may be powered off or in a low-power state.

The electronic device 10 may periodically check the playback time remaining for audio stream A. If the time remaining has fallen within a first threshold, as indicated by a decision block 104, the electronic device 10 may prepare the second memory 20 to be activated at block 106. By way of example, a memory controller and/or memory buses associated with the second memory 20 may be powered on, and/or the second memory 20 may begin to enter an active state. The first threshold may be determined to allow sufficient time such that the second memory 20 is ready to perform the crossfading operation when needed. By way of example, if the crossfading operation should begin approximately 10 seconds prior to the end of audio stream A, the first threshold may be approximately 10.5 seconds prior to the end of audio stream A to allow approximately 0.5 seconds for warming up the second memory 20. As illustrated by a decision block 108, when the time remaining for audio stream A falls beneath a second threshold (e.g., 10 seconds), the crossfading operation may begin and, as indicated by block 110, the second memory 20 may be fully powered on and ready to store data associated with the crossfading operation.

Blocks 112, 114, and 116 may represent a process of decoding of one or more frames of either audio stream A or audio stream B. That is, at block 112, the audio accelerator 18 may be halted from decoding audio stream A, and its current audio state (audio state A 88) may be stored into first memory 14 before being copied into the second memory 20. Meanwhile, audio state B 90 may be copied into the first memory 14 in place of the audio state A 88, before being loaded into the audio accelerator 18, at block 114. The first time that block 114 takes place, the audio state B 90 may be copied into the first memory 14 from the nonvolatile storage 16, but in subsequent iterations of block 114, the audio state B 90 may be copied into the first memory 14 from the second memory 20. Additionally, if audio streams A and B are encoded in different formats, which may require different respective codecs to decode them, the audio accelerator 18 may also load the associated codec from the audio code 74 during block 114. At block 116, the audio accelerator 18 may decode one or more frames of audio stream B. In some embodiments, each frame of audio may be approximately 23 ms, but in other embodiments, the frames of audio may have a different duration. In some embodiments, as the decoded audio of audio stream B is received into the first memory 14 during block 116, the CPU 12 or audio accelerator 18 may mix the recently decoded frames of audio stream B with previously decoded frames of audio stream A.

If, according to decision block 118, time remains on audio stream A, the crossfading operation may not have completed. Thus, blocks 112, 114, and 116 may repeat, except that rather than decode one or more frames of audio stream B, the audio accelerator 18 may decode one or more frames of audio stream A. That is, at block 112, the audio accelerator 18 may be halted from decoding audio stream B, and its current audio state (audio state B 90) may be stored into first memory 14 before being copied into the second memory 20. Meanwhile, audio state A 88 may be copied into the first memory 14 in place of the audio state B 90, before being loaded into the audio accelerator 18, at block 114. At block 116, the audio accelerator 18 may decode one or more frames of audio stream A. In some embodiments, the CPU 12 or audio accelerator may also mix the recently decoded frames of audio stream A with previously decoded frames of audio stream B at block 116.

Blocks 112, 114, and 116 may thus continue to repeat, alternatingly causing the audio accelerator 18 to decode one or more frames of audio stream A or audio stream B, until no time remains on audio stream A, as illustrated by decision block 118. Thereafter, audio state B 90 may be copied onto the first memory 14 (if not already present) and the second memory 20 may be powered off or deactivated to a low power state, at block 120. At block 122, the electronic device 10 may remain playing back only audio stream B. Since the second memory 20 is powered off at this time, the electronic device 10 may consume less power from the power source 22.

Turning next to FIG. 7, a flowchart 130 illustrates an additional or alternative embodiment of the crossfading operation depicted in FIG. 6. In a first block 132, the electronic device 10 may be playing back only audio stream A. Thus, the audio accelerator 18 may be playing back only audio stream A from among the incoming audio data 76, the audio code 84 of the audio accelerator 18 may include a codec for decoding audio stream A, and the decoding state 86 of the audio accelerator 18 may be the audio state A 88. Since only audio stream A is being decoded, the second memory 20 may be powered off or in a low-power state.

At block 134, a user of the electronic device 10 may begin navigating through a user interface of the electronic device 10. For example, the user may navigate an audible menu listing various playlists and/or songs the user has stored on the electronic device 10. In response, the electronic device 10 may begin, at block 136, to warm up and/or power on the second memory 20 in the manners described above. In this way, the electronic device 10 may be prepared to perform a crossfading operation any time thereafter, such as when the user selects a new audio stream (e.g., audio stream B) to play back, as indicated at block 138.

Since the user of the electronic device has elected to play a new audio stream (e.g., audio stream B) at block 138, the electronic device 10 may crossfade from audio stream A to audio stream B at blocks 140-146. Blocks 140, 142, and 144 may take place in substantially the same manner as blocks 112, 114, and 116. In decision block 146, the electronic device 10 may determine whether the amount of crossfading time (e.g., t241) has passed. Thus, blocks 140, 142, and 144 may continue to repeat, alternatingly causing the audio accelerator 18 to decode one or more frames of audio stream A or audio stream B, until the crossfading operation has completed. Thereafter, audio state B 90 may be copied onto the first memory 14 (if not already present) and the second memory 20 may be powered off or deactivated to a low power state, at block 148. At block 150, the electronic device 10 may remain playing back only audio stream B.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
   storing a first portion of information associated with an audio processing operation on a first memory;
   activating a second memory, wherein the second memory is one of static random access memory (RAM) and dynamic RAM;
   copying a decoding state of the information associated with the audio processing operation from the first memory to the activated second memory;
   performing the audio processing operation using a processor based on said decoding state and another portion of the information stored on the second memory; and
   deactivating the second memory.

2. The method of claim 1, wherein the second memory is activated in response to a user-input stimulus.

3. The method of claim 1, wherein the second memory is activated in response to an expected termination of an audio stream.

4. The method of claim 1, wherein activating the second memory comprises supplying power to the second memory and wherein deactivating the second memory comprises reducing the power supplied to the second memory.

5. The method of claim 1, wherein activating the second memory comprises activating a memory device integrated into a semiconductor device that includes the first memory and a processor.

6. The method of claim 1, wherein the audio processing operation comprises crossfading, audio equalization, audio buffering, mixing sound effects, or decoding audio encoded with an audio codec too large to store on the first memory, or any combination thereof.

7. An electronic device comprising:
   a portable electronic device having integrated therein,
      a central processing unit having internal memory of a first type; and
      additional memory of a second type different than the first type, wherein the additional memory is one of static random access memory (RAM) and dynamic RAM and is configured to remain deactivated except when an audio processing operation that involves more information storage than would be available on the first type memory is expected to take place, wherein the central processing unit is configured to copy a decoding state of the information associated with the audio processing operation from the first type memory to the activated second type memory to perform the audio processing operation based on said decoding state and another portion of the information stored on the second type memory.

8. The electronic device of claim 7, wherein the central processing unit is configured to cause the additional memory to become activated prior to a crossfading operation and to become deactivated after the crossfading operation.

9. The electronic device of claim 7, wherein the internal memory comprises static random access memory and the additional memory comprises synchronous dynamic random access memory.

10. The electronic device of claim 7, wherein the internal memory is configured to consume less power per unit of storage than the additional memory.

11. The electronic device of claim 7, wherein the second type memory is configured to remain deactivated except when the audio processing operation is expected to take place, wherein the audio processing operation is expected to take place when the electronic device determines that a first audio stream is about to end and a second audio stream is about to begin.

12. The electronic device of claim 11, wherein the first audio stream is about to end and the second audio stream is about to begin when less than a threshold amount of playback time for the first audio stream remains.

13. The electronic device of claim 11, wherein the first audio stream is about to end and the second audio stream is about to begin when a user interface of the electronic device is being navigated.

14. A system comprising:
  a portable electronic device having integrated therein,
    an audio accelerator configured to concurrently decode a first audio stream and a second audio stream by decoding a portion of the first audio stream when a first audio state is loaded onto the audio accelerator and to decode a portion of the second audio stream when a second audio state is loaded onto the audio accelerator;
    a first memory configured to store the first audio state while the portion of the first audio stream is decoded by the audio accelerator and to store the second audio state while the portion of the second audio stream is decoded by the audio accelerator, while the audio accelerator concurrently decodes the first audio stream and the second audio stream; and
    a second memory configured to store the first audio state while the portion of the second audio stream is decoded by the audio accelerator and to store the second audio state while the portion of the first audio stream is decoded by the audio accelerator, while the audio accelerator concurrently decodes the first audio stream and the second audio stream, wherein the second memory is configured to remain deactivated unless the audio accelerator begins concurrently decoding the first audio stream and the second audio stream, has finished concurrently decoding the first audio stream and the second audio stream, or is concurrently decoding the first audio stream and the second audio stream.

15. The system of claim 14, wherein the audio accelerator is configured to decode the portion of the first audio stream when the first audio state is loaded onto the audio accelerator from the first memory, wherein the first memory is configured to obtain the first audio state from the second memory.

16. The system of claim 14, wherein the audio accelerator is configured, after decoding the portion of the first audio stream, to halt and to save the first audio state to the first memory.

17. The system of claim 14, wherein the first memory comprises a primary memory buffer associated with information provided to and received from the audio accelerator.

18. A method comprising:
  decoding a portion of a first audio stream based at least in part on a first audio state, wherein a first memory stores the first audio state while the portion of the first audio stream is being decoded;
  after the portion of the first audio stream has been decoded, copying the first audio state from the first memory to a second memory;
  decoding a portion of a second audio stream based at least in part on a second audio state, wherein the first memory stores the second audio state, but not the first audio state, while the portion of the second audio stream is decoded;
  after the portion of the second audio stream has been decoded, copying the second audio state from the first memory to the second memory and copying the first audio state from the second memory to the first memory; and
  decoding another portion of the first audio stream based at least in part on the first audio state, wherein the first memory stores the first audio state, but not the second audio state, while the another portion of the first audio stream is being decoded.

19. The method of claim 18, wherein the portion of the first audio stream, the portion of the second audio stream, and the another portion of the first audio stream are decoded using an audio accelerator.

20. The method of claim 19, comprising, after the portion of the first audio stream has been decoded, saving the first audio state from the audio accelerator onto the first memory and, after the portion of the second audio stream has been decoded, saving the second audio state from the audio accelerator onto the first memory.

21. The method of claim 19, comprising loading the first audio state into the audio accelerator from the first memory before decoding the portion of the first audio stream and before decoding the another portion of the first audio stream and loading the second audio state into the audio accelerator from the first memory before decoding the portion of the second audio stream.

22. An electronic device comprising:
  a central processing unit;
  internal memory, wherein the internal memory is configured to supply all memory used by the electronic device when the electronic device is playing back only one audio stream; and
  an additional memory configured to receive a signal from within said electronic device that a) increases a power state of the additional memory when the electronic device is expected to concurrently play back more than one audio stream when a first audio stream has less than a threshold amount of playback time remaining and b) decreases the power state when the electronic device is not expected to concurrently play back more than one audio stream.

23. The method of claim 1, wherein the first memory is static random access memory and the second memory is synchronous dynamic random access memory.

24. The method of claim 1, further comprising:
  accessing non-volatile storage to obtain an audio file upon which the audio processing operation is to be performed.

* * * * *